(12) United States Patent
Kelemen

(10) Patent No.: US 6,252,744 B1
(45) Date of Patent: Jun. 26, 2001

(54) VOICE-COIL INTEGRATED NON-CONTACTING MAGNETIC LATCH FOR A DISC DRIVE ACTUATOR ASSEMBLY

(75) Inventor: Andrew Kelemen, Superior, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/260,617

(22) Filed: Mar. 1, 1999

(51) Int. Cl.$^7$ ..................................................... G11B 5/54
(52) U.S. Cl. ...................................... 360/256.2; 360/264.9
(58) Field of Search ........................... 360/256.2, 256.3, 360/264.9

(56) References Cited

U.S. PATENT DOCUMENTS

| | | | |
|---|---|---|---|
| 4,196,456 | * | 4/1980 | Manzke et al. ........................ 360/106 |
| 5,315,466 | * | 5/1994 | Nishimoto et al. .................. 360/106 |
| 5,452,159 | * | 9/1995 | Stefansky ............................... 360/105 |
| 5,566,375 | * | 10/1996 | Isomura ................................. 360/105 |
| 5,581,424 | * | 12/1996 | Dunfield et al. ...................... 360/105 |
| 5,734,527 | * | 3/1998 | Reinhart ................................. 360/105 |
| 5,742,453 | * | 4/1998 | MacPherson .......................... 360/105 |
| 5,768,063 | * | 6/1998 | Suwa et al. ............................ 360/106 |
| 5,801,907 | * | 9/1998 | Yagi et al. .............................. 360/105 |
| 6,028,744 | * | 2/2000 | Amirkiai et al. ...................... 360/105 |

* cited by examiner

Primary Examiner—Brian E. Miller
(74) Attorney, Agent, or Firm—Merchant & Gould, P.C.

(57) ABSTRACT

Embodiments of the instant invention are directed to a head parking assembly for a disc drive assembly. In preferred embodiments, the head parking assembly comprises a voice coil motor and a non-contacting magnetic latch mechanism, wherein the voice coil motor comprises a plurality of backirons, a plurality of permanent magnets, a coil, a conductive standoff and a nonconductive standoff. The permanent magnets are disposed on the backirons and the standoffs reside at opposite ends of the backirons being disposed substantially perpendicularly thereto. The coil is located in the gap between the permanent magnets, such that when an electric field is passed through the coil, the resulting magnetic field in the coil operates in conjunction with the magnetic fields of the permanent magnets to control the movement of the head across the disc. A preferred embodiment of a non-contacting magnetic latch mechanism includes a pair of non-contacting magnetic latch pins, wherein the pins reside adjacent the nonconductive standoff and provide a conduit for the magnetic field generated by the permanent magnets. The pins are positioned in a spaced relation, such that a gap is created inbetween the pins, wherein the magnetic field from the permanent magnets is defined through the pins and across the gap and operate in conjunction with a head-arm assembly for securing or parking a disc head.

12 Claims, 7 Drawing Sheets

VOICE-COIL INTEGRATED NON-CONTACTING MAGNETIC LATCH FOR A DISC DRIVE ACTUATOR ASSEMBLY

FIELD OF THE INVENTION

This invention is directed to disc drive assemblies having a magnetic head for reading and writing; and in preferred embodiments, to disc drives utilizing a non-contacting magnetic latch mechanism for securing the head during nonuse.

BACKGROUND OF THE INVENTION

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Conventional disc drive systems typically include one or more recording discs supported for relatively high speed rotation on a rotary spindle. For example, FIG. 1 shows a side view of portions of a conventional disc drive system, including a conventional data storage or recording disc 200 supported on a spindle 210. A disc drive motor (not shown) is operatively coupled to the spindle 210 for rotation of the spindle 210 and the disc 200 supported thereon. A recording and/or reading head 220 is supported by suitable head support structure (not shown) adjacent the recording surface of the disc 200. To simplify the disclosure, FIG. 1 is shown with a single recording disc 200 having a single recording surface and a single head 220. However, other conventional disc drive systems employ multiple discs, double-sided discs (discs with recording surfaces on both surfaces) and multiple heads.

As shown in FIG. 1, the disc 200 has a central hub opening through which the spindle 210 extends. The disc 200 and spindle 210 are shown in a top view in FIG. 2. The spindle 200 extends through a central opening, which defines an inside diameter, of the disc. The disc 220 is secured at its inner diameter (ID), in a fixed relation with the spindle 210, and is supported such that the outer diameter (OD) portion of the disc 200 is free from contact with other components. In this regard, the disc 200 is clamped at its ID to the spindle 210 and is free at its OD. When the spindle 210 is rotatably driven, the disc 200 is caused to rotate with the spindle 210. A top (not shown) provides a protective cover for the disc 200.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly.

The surfaces of the stacked discs are accessed by the read/write heads which are mounted on a complementary stack of arms which form a part of a head-arm assembly. Generally, the head-arm assembly has a body that pivots about a pivot mechanism disposed in a medial portion thereof. The body of the head arm assembly has a distal end on one side of the pivot mechanism and a proximal end on the opposite side of the pivot mechanism, adjacent the disk stack. The distal end of the body includes a pair of yokes 123, 125 (FIG. 4), on opposite sides of a coil 129. The head arm assembly selectively positions a proximal end of the body in response to positioning electronic signals applied to the coil. This positioning of the proximal end in cooperation with the pivot mechanism causes a distal end of the body, which supports the read/write heads, to move radially across the recording surfaces of the discs.

In this manner, the body of the head arm assembly may be moved in a pivotal motion to selectively position the head adjacent any recording location on the recording surface as the disc is rotated. Additionally, a yoke portion of the body of the head-arm assembly is aligned with a travel limiter stop, so as to contact the stop at one end of pivotal motion of the body.

In operation, the head 220 is moved in the radial direction to align or register with a desired track location on the recording surface of the disc. Once aligned or registered with the desired track location, the head 220 is operated to read or write information onto the recording surface at the desired track location. It is important to properly register the head 220 with the track location to effect accurate reading or writing operations on the registered track.

As stated above, when the head drive is not in use, the head is secured, or parked. As the head is easily damaged, care is required during the parking of the disc. In some conventional systems, once the servo-system is turned off, excess energy, or back emf pulses are used to move the head-arm assembly such that the head travels radially inward, toward the center of the disc for parking. As the head moves radially inward, the yoke end of the head-arm assembly swings radially outward until the head-arm assembly contacts the travel limiter.

One problem currently encountered during the parking of the head is that upon contact with the travel limiter, the yoke tends to bounce off of the travel limiter as there is no mechanism to grab the yoke and prevent it from moving. If the yoke bounces away from the travel limiter, the magnetic head then bounces back over the recording area of the disc. If the head-arm assembly continues to oscillate, the magnetic head is subjected to potentially violent movement back and forth across the disc which can cause damage to the head and/or result in head-disc contact in the recording area of the disc.

Attempts have been made to prevent the head from uncontrollable movement during parking. For instance, in one conventional system, a magnet device for providing a magnetic field between a pair of permanent magnets is added outside of the voice coil motor. In this system, a metal plate is added to the yoke that is nearest the added magnet device. The field that is created by the magnet device draws the metal plate on the yoke into the center of the magnetic field between the permanent magnets, such that the yoke, and therefore, the head, is substantially held in place. However, the additional magnet device located external to the voice coil motor can result in an increase in the cost of manufacturing, both in time and materials. Also, the use of an additional magnet device increases the number of components required to be contained in the disc drive housing and, thus, can require larger capacity housings or greater density and physical crowding of the disc drive system components in the housing. Also, because the additional magnet device creates a further magnetic field external to the voice coil motor structure, the additional magnet device can potentially cause interference with the magnetic storage of the storage discs.

In another system, a metal plate is attached to the yoke arm and a small cut is made in one of the conductive standoffs. The small cut allows for "loose" flux which attracts the metal plate. During parking, the metal plate is drawn by the loose flux to the conductive standoff and physically crashes into the conductive standoff thereby allowing metal to metal contact. As it is necessary to maintain a virtually clean environment inside the disc drive, metal to metal contact jeopardizes the cleanliness of the environment as particulate matter from the contacting metal can break loose and float within the disc drive housing.

As such, a need in the industry exists for a mechanism that allows for the securing or parking of the magnetic head in a controlled manner such that the possibility of the head uncontrollably oscillating is substantially eliminated. Further, a need exists for such a mechanism that minimizes any increase in manufacturing cost or complexity and is effective in maintaining a substantially contaminant free housing environment.

SUMMARY OF THE DISCLOSURE

The instant invention is directed to a head parking assembly for a disc drive assembly having a non-contacting magnetic latch mechanism, wherein the non-contacting magnetic latch mechanism operates in conjunction with a head-arm assembly for securing or parking the disc head, and wherein the non-contacting magnetic latch mechanism resides at one end of the head-arm assembly when it is not in use. Preferred embodiments of the disc drive assembly include a head-arm assembly having an arm, a suspension member and a read/write head, wherein the head is disposed at one end of the suspension member and the arm is coupled to an opposite end of the suspension member. The head resides over the disc and moves in a radial manner across the disc such that the head can read from and/or write to the disc. The head-arm assembly further includes a yoke, wherein the yoke is coupled to a flux plate.

In preferred embodiments, the head parking assembly comprises a voice coil motor and a non-contacting magnetic latch mechanism. The voice coil motor comprises a plurality of backirons, a plurality of permanent magnets, a coil, a conductive standoff and a nonconductive standoff. The magnets are disposed on the backirons which are made from iron metal or other magnetically conductive material. The standoffs reside at opposite ends of the backirons and are disposed substantially perpendicularly thereto. The coil is located in the gap between the permanent magnets, such that when an electric field is passed through the coil, the resulting magnetic field in the coil operates in conjunction with the magnetic fields of the permanent magnets to control the movement of the head across the disc.

A preferred embodiment of a non-contacting magnetic latch mechanism includes a pair of non-contacting magnetic latch pins. The pins reside adjacent the nonconductive standoff. As the pins are made from magnetically conductive material, the pins provide a conduit for magnetic field generated by the permanent magnets. The pins are positioned in a spaced relation, such that a gap is created inbetween the pins. During the parking of the disc, the transmission of the electric current through the coil is ceased. Nonetheless, the magnetic field from the permanent magnets is defined through the pins and across the gap, as represented by a set of flux lines across the gap. As the head moves towards the inner radius of the disc, the yoke having the flux plate moves towards the pins. Once the flux plate is proximal to the pins, the yoke is drawn toward the pins by the magnetic field across the gap, thereby stabilizing the movement of the head.

A feature of preferred embodiments of the instant invention is the use of non-contacting magnetic latch configuration. An advantage to this feature is that the non-contacting magnetic latch is capable of stabilizing the head during parking such that it does not uncontrollably move. A further advantage to this feature is that the possibility of crashing the disc drive is minimized. A still further advantage is that no additional magnets are required; rather, the existing magnets of the voice coil motor are used, thereby minimizing any additional costs.

Another feature of further preferred embodiments is the use of a non-contacting magnetic latch configuration comprising a pair of magnetically conductive pins that are spaced apart and define a portion of the magnetic field path of the voice coil motor ("VCM") magnets. An advantage to this feature is that the yoke does not crash into the pins causing metal to metal contact within the sealed environment of the disc drive assembly or causing the head to uncontrollably oscillate.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 1:
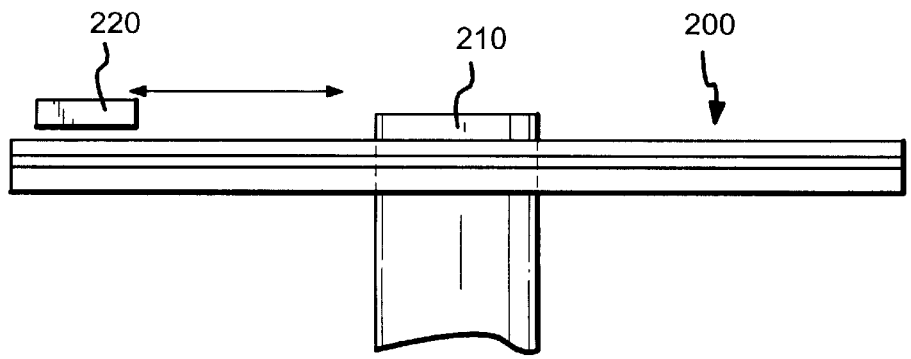
FIG. 1 is a side view of portions of a conventional disc drive system and recording disc.
Figure 2:
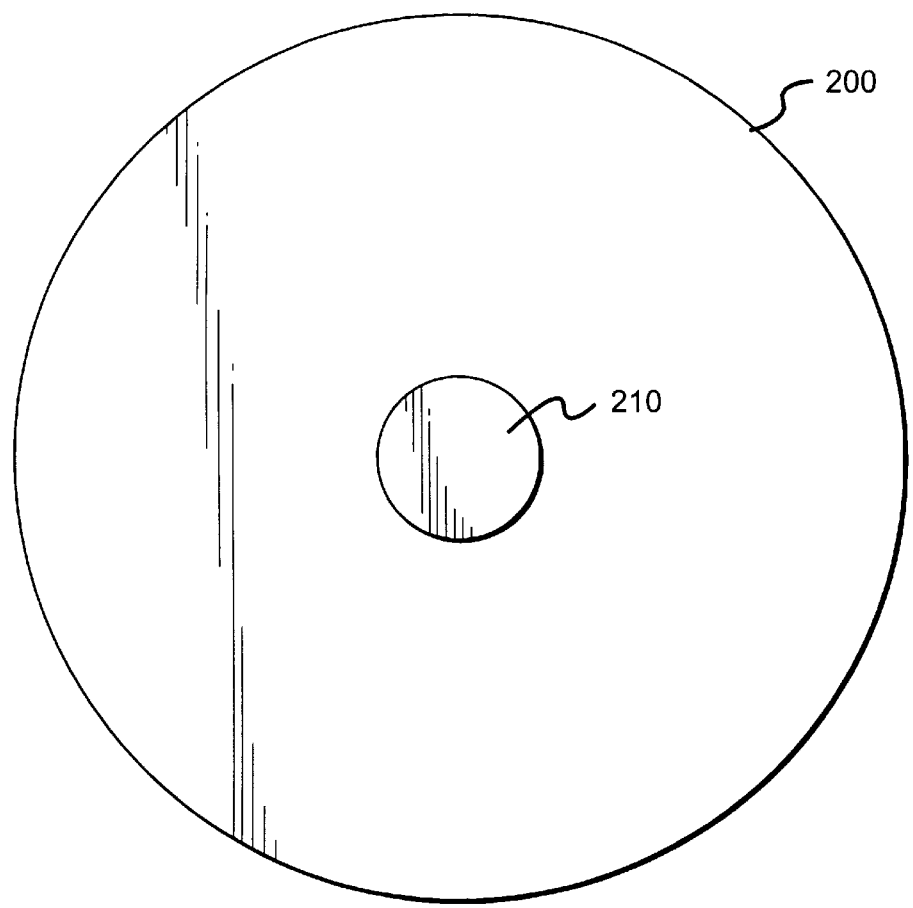
FIG. 2 is a top view of the recording disc and spindle of the system shown in FIG. 1.
Figure 3:
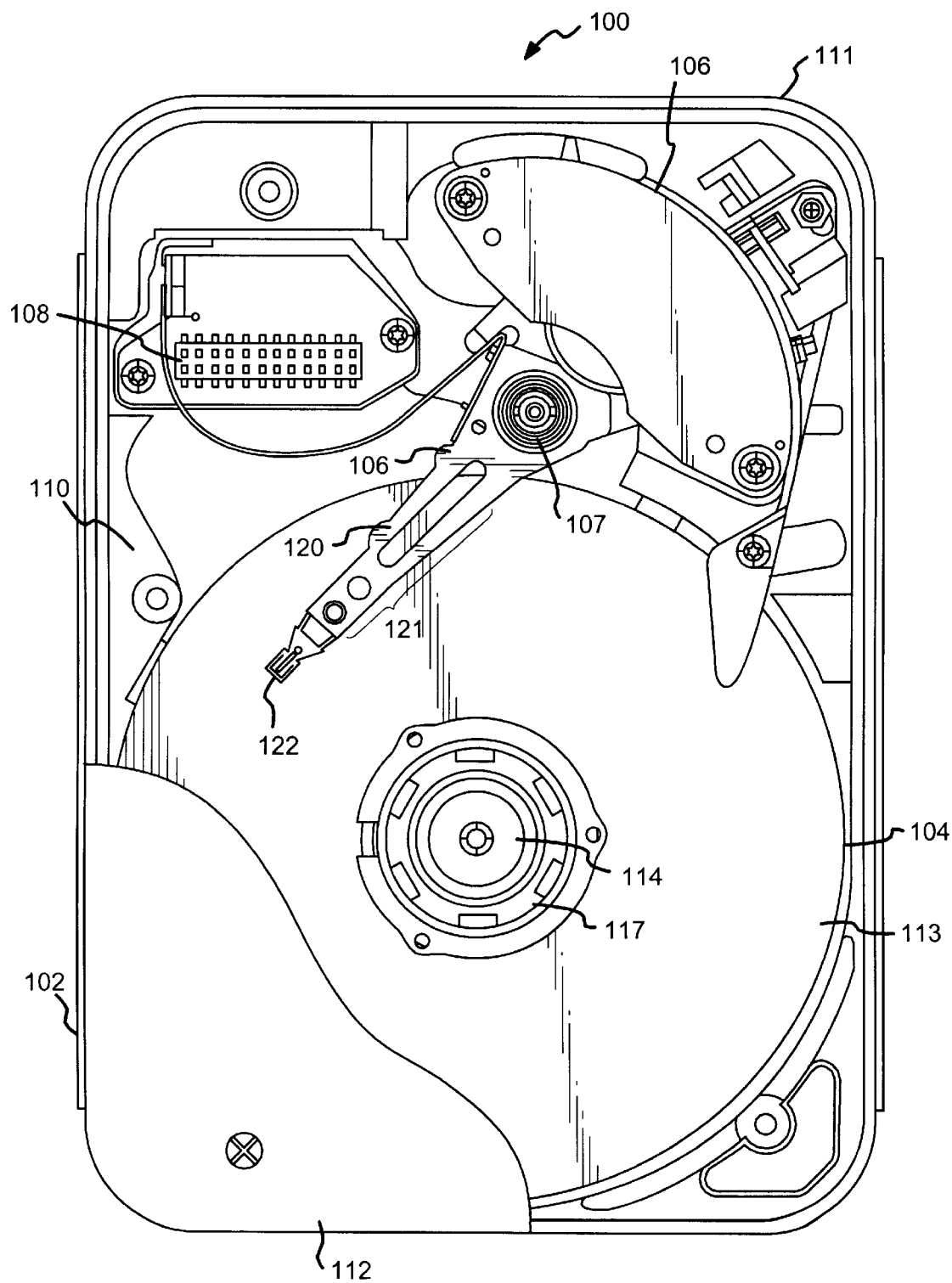
FIG. 3 is a top view of a preferred embodiment of a disc drive assembly.

FIG. 3 is a top view of a preferred embodiment of a disc drive apparatus 100 of the instant invention. As shown in FIG. 3, the disc drive apparatus 100 includes a housing 102, at least one data storage disc 104, a head-arm assembly 106 which resides adjacent the data storage disc 104 and a controller 108 (partially shown). FIG. 3 is a top plan view of the disc drive apparatus 100, wherein a top portion of the apparatus 100 has been cut-away to expose a head-arm assembly 106 positioned over the data storage disc 104. It will be understood that numerous details of construction of the disc drive 100 are not included in the following description as they are well known to those skilled in the art and are believed to be unnecessary for the purpose of describing the present invention.

The housing 102 includes a base section 110 and a top section 112, wherein the base section 110 is configured to support the data storage disc 104 and the head-arm assembly 106. The top section 112, coupled with the base section 110 and a perimeter gasket 111, provide a sealed internal environment for the disc drive 100.

The data storage disc 104 includes a recording surface 113 which defines, for example, concentric circular data tracks (not shown). Alternatively, the recording surface 113 may define a spiral track configuration. The recording surface 113 is capable of receiving and/or storing information for later use.

Adjacent the disc 104 is a head-arm assembly 106 which pivots on a pivot spindle assembly 107. The head-arm assembly 106 includes an arm 120, a suspension member 121 and a read/write head 122, wherein the head 122 is positioned over the data storage disc 104 at one end of the suspension member 121. The head-arm assembly 106 further includes yokes 123, 125 (see FIG. 4), wherein yoke 125 is coupled to a flux plate 127. The suspension member 121 can be moved across the recording surface 113 of the disc 104, thereby allowing the head 122 to be moved across the recording surface 113 such that the information on the disc 104 can be read.

A plurality of storage discs 104 may be arranged in a stack, supported on the motor 114. A plurality of heads are supported on the head-arm assembly 106 coupled together in an E-block structure to access the discs 104 simultaneously, wherein each head accesses one of two surfaces (top and bottom) of each disc 104.

The movement of the head-arm assembly 106 is controlled by the controller 108. The controller 108 is coupled to the base section 110 and is in electronic communication with further components of the disc drive apparatus 100. The controller 108 comprises any suitable means capable of controlling the components of the disc drive, such as, the motor 114 and the head-arm assembly 106. In one preferred embodiment, the controller is an integrated circuit board.

Figure 4:
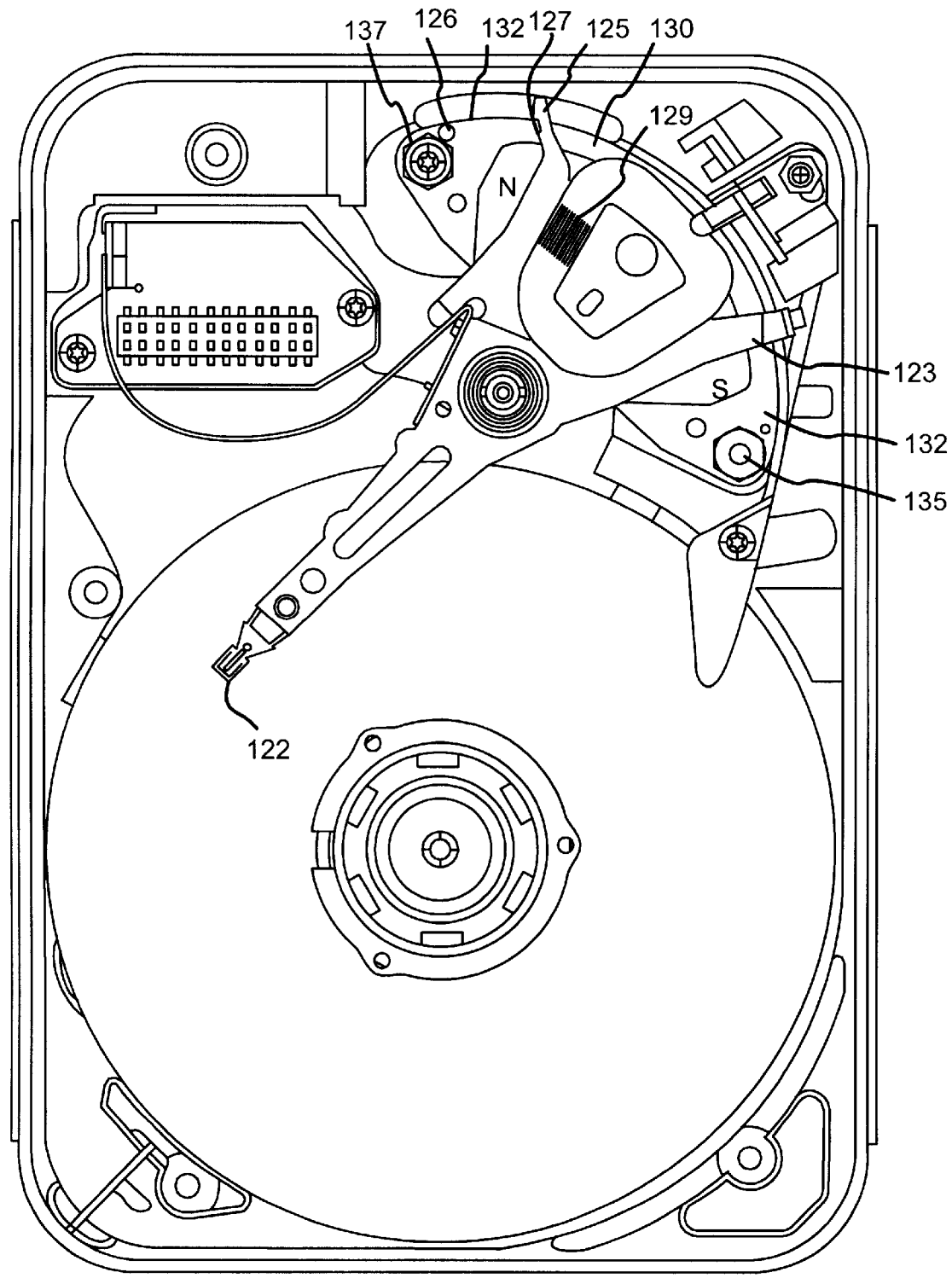
FIG. 4 is a top view of the disc drive assembly in FIG. 3 exposing elements of a non-contacting magnetic latch assembly according to an embodiment of the invention.
Figure 5:
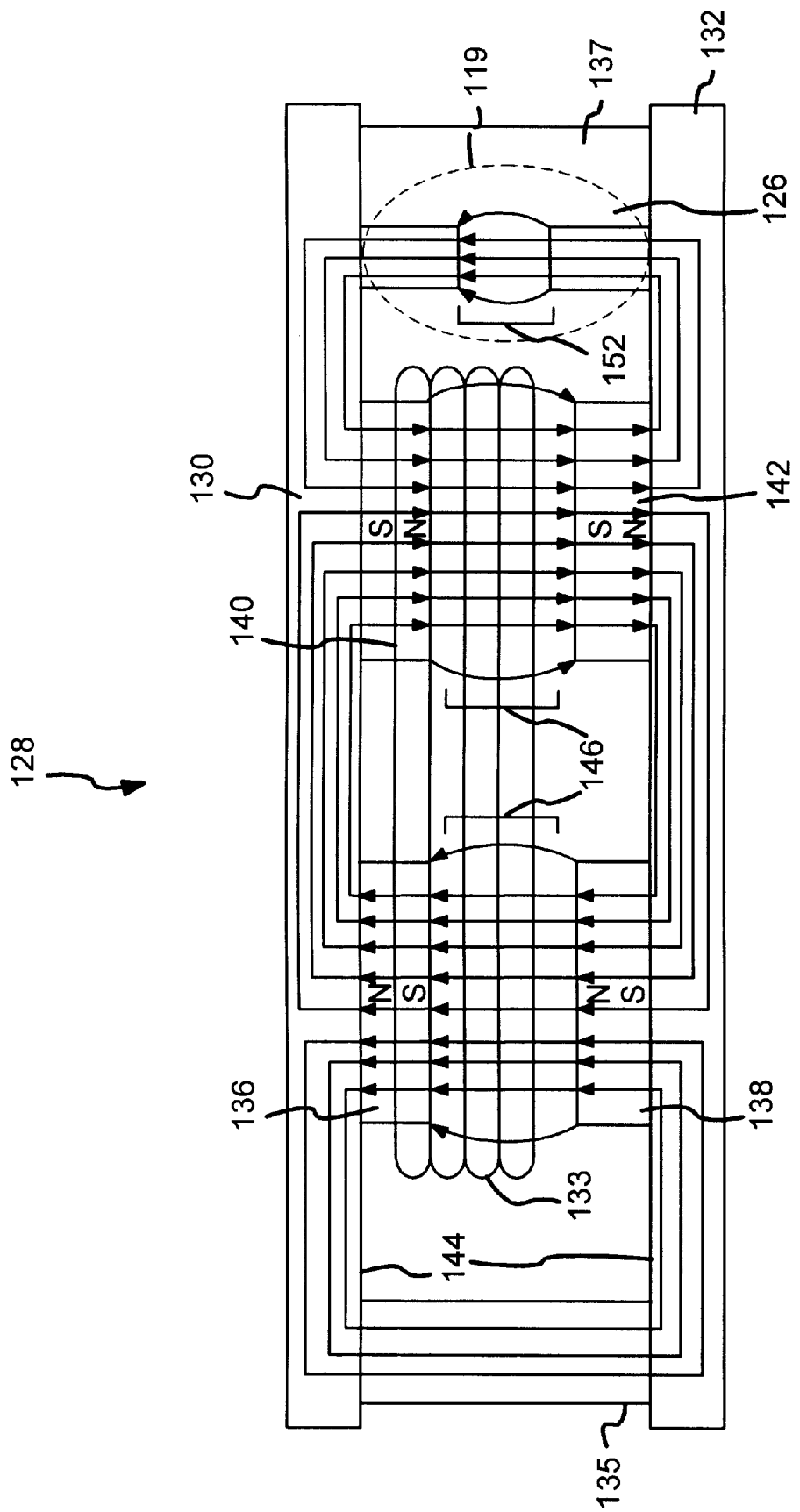
FIG. 5 is a schematic cross section of magnetic field lines generated during activation of the disc drive.

Embodiments of the instant invention are more specifically directed to a head parking assembly having a non-contacting magnetic latch mechanism 119 for securing or parking the disc head when it is not in use. With reference to FIGS. 4 and 5, the head parking assembly comprises a voice coil motor 128 and a non-contacting magnetic latch mechanism 119.

Figure 6:
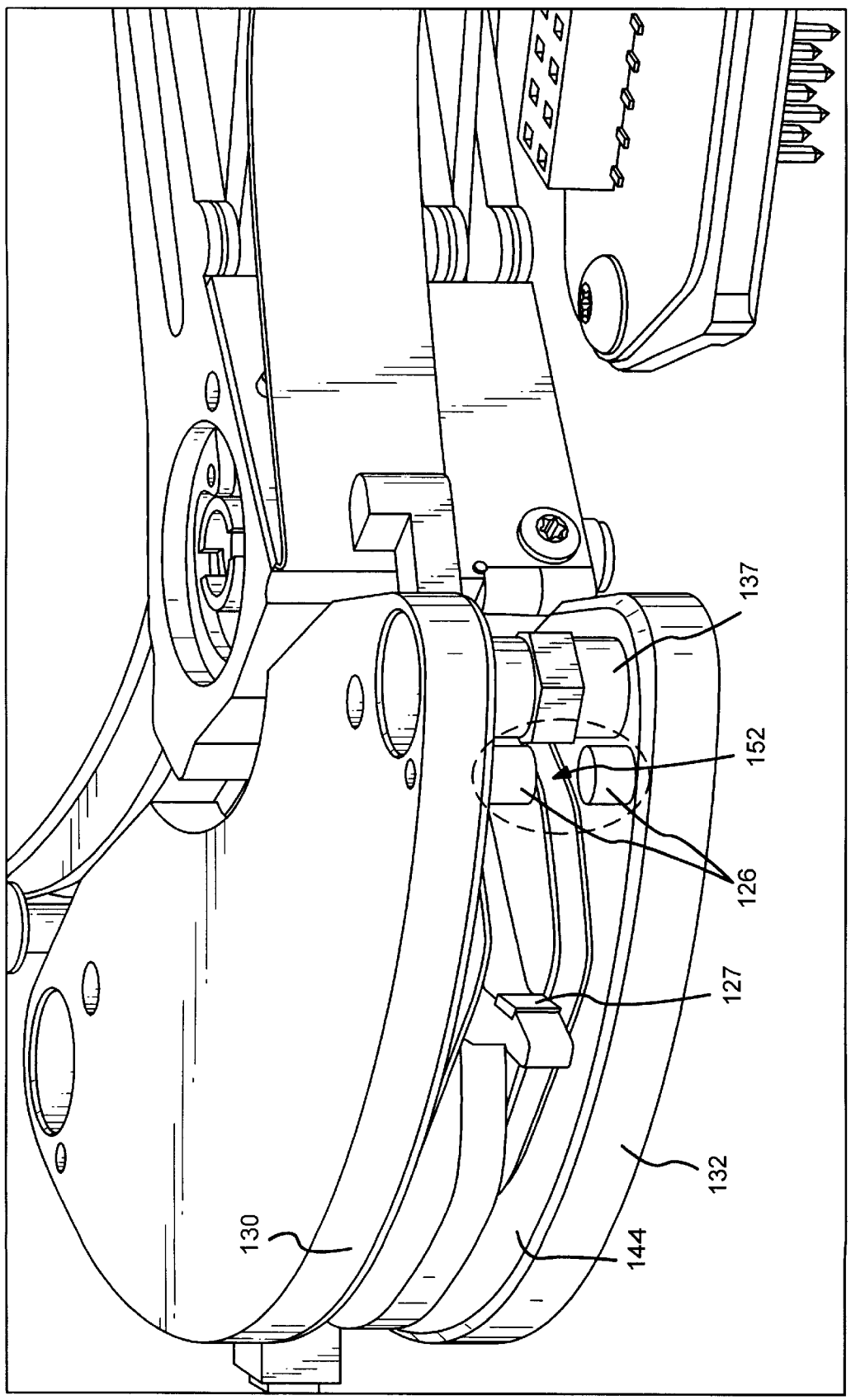
FIG. 6 is a side perspective of the non-contacting magnetic latch assembly of FIG. 4.

In preferred embodiments, the voice coil motor 128 comprises a plurality of backirons 130, 132, a plurality of permanent magnets 136, 138, 140, 142, a coil 133, a conductive standoff 135 and a nonconductive standoff 137. The backirons 130, 132 are plates having an inner surface 144 and are made from metal or other conductive material. With reference to FIG. 6, a first backiron 130 is disposed above the head-arm assembly 106 and a second backiron 132 is disposed below the head-arm assembly 106 such that the head-arm assembly 106 is sandwiched in-between the backirons 130, 132. The backirons 130, 132 are substantially semi-circle in shape, although any shape that allows pivotal movement of the actuator assembly 106 is suitable.

A plurality of permanent magnets 136, 138, 140, 142 are disposed along the inner surface 144 of the backirons 130, 132. In one preferred embodiment, two pairs of permanent magnets (136, 138), (140, 142) are placed approximately 2.87 mm apart from each other along the inner surfaces 144 of the backiron plates 130, 132 such that the magnets 136, 140 on the top backiron 130 are aligned with the magnets 138, 142 on the lower backiron 132, respectively. In other preferred embodiments, any spacing which optimizes the magnetic parameters is suitable.

With reference to FIG. 5, the magnets 136, 138, 140, 142 are arranged to define a plurality of closed flux paths, with the north pole of magnet 138 facing the south pole of magnet 136 and with the north pole of magnet 140 facing the south pole of magnet 142.

The upper 136, 140 and lower magnets 138, 142 are spaced apart such that a gap 146 is formed between them. As these are permanent magnets a naturally occurring magnetic field is continuously present. As shown in FIG. 5, the field lines representing the magnetic field of the permanent magnets define a closed loop. A first closed loop path of magnetic field lines is shown through the magnet 136, the backiron 130, the conductive standoff 135, the backiron 132, the magnet 138 and across the gap between the magnets 136 and 138. A second closed loop path of magnetic field lines is shown through magnet 136, the backiron 130, permanent magnets 140, 142, backiron 132, permanent magnet 138 and across the gap between the magnets 136 and 138. A third is closed loop path of magnetic field lines 18 shown from permanent magnet 140, permanent magnet 142, backiron 132, across the gap between a pair of non-contacting magnetic latch pins 126 (discussed below), backiron 130 and across the gap between magnets 140 and 142.

Still with reference to FIG. 5, a coil 133 is disposed in the gap between the magnets 136, 138, 140, 142. When electric current is passed through the coil 133, the coil 133 induces a magnetic field that operates in conjunction with the magnetic fields of the permanent magnets 136, 138, 140, 142, to facilitate the movement of the head-arm assembly 106, and thus, the head, across the data storage disc 104. The manner of controlling head-arm movement is well known in the art and thus is not discussed herein.

Standoffs 135, 137 are disposed between the top backiron 130 and the lower backiron 132. The standoffs couple the top backiron 130 to the lower backiron 132. In preferred embodiments, the standoffs 135, 137 are disposed at the ends of the backirons 130, 132; however, the standoffs 135, 137 can be located at any position on the backirons 130, 132 such that the permanent magnets 136, 138, 140, 142 are disposed in-between the standoffs 135, 137.

In preferred embodiments, standoff 135 is made from a magnetically conductive material and standoff 137 is made from a magnetically nonconductive material. When the head of the head-arm assembly 106 moves towards the inside radius of the disc, the yoke 125 of the head-arm assembly 106 moves towards the nonconductive standoff 137.

The non-contacting magnetic latch mechanism 119 comprises a pair of non-contacting magnetic latch pins. With reference to FIG. 6, the pins 126 reside adjacent the nonconductive standoff 137. One pin is coupled to the inner surface 144 of the upper backiron 130 and the second pin is coupled to the inner surface 144 of the lower backiron 132 such that a gap 152 is defined between the pins 126. The pins 126 are made from a magnetically conductive material such that a magnetic field is defined through the pins 126 and across the gap 152. As discussed above, a portion of the magnetic field generated by magnets 140, 142 is defined through the pins 126, and thereby completes the magnetic circuit, since, unlike standoff 135, standoff 137 is nonconductive.

Figure 7:
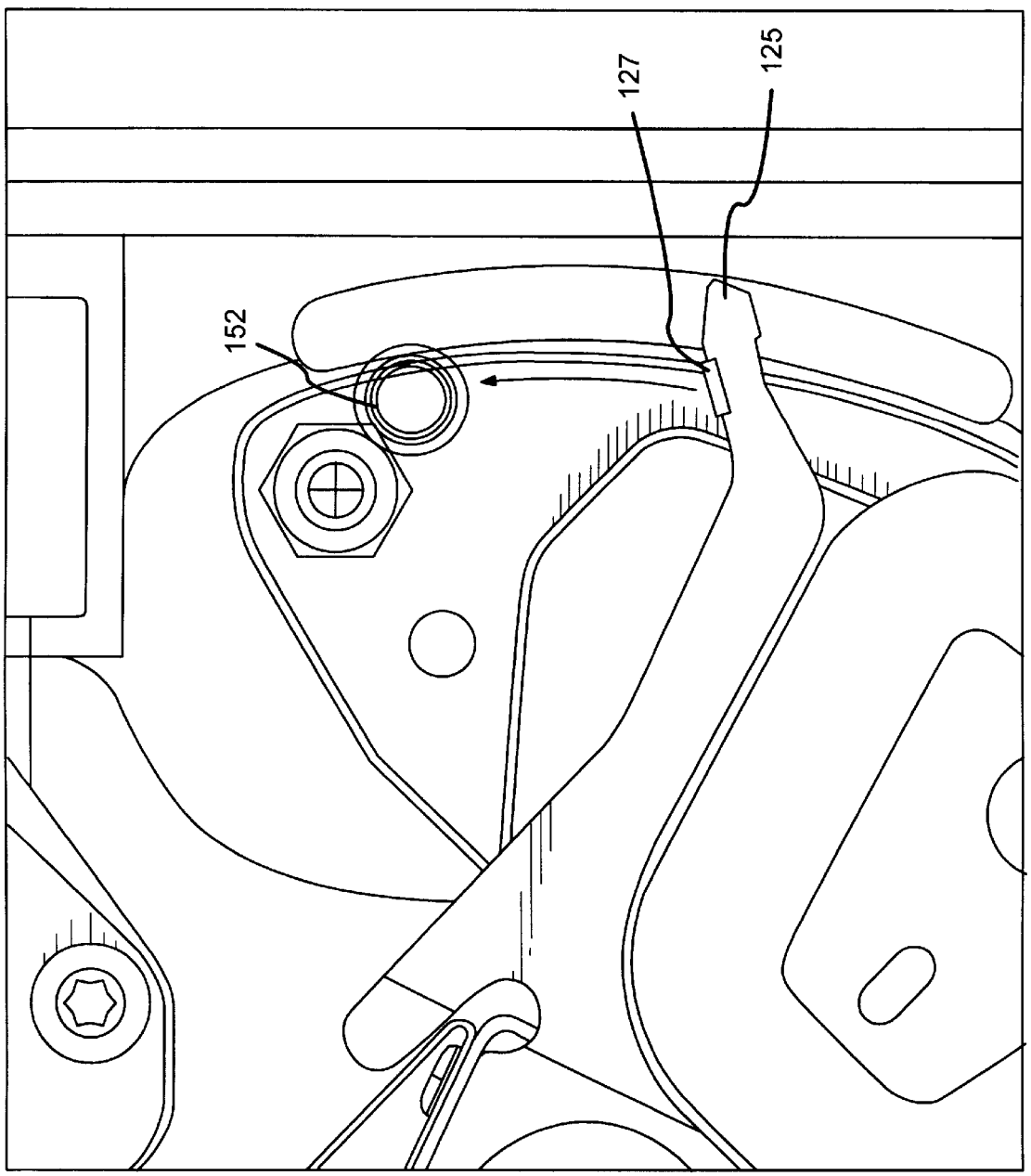
FIG. 7 is top view of a preferred embodiment of the non-contacting magnetic latch assembly of FIG. 4.

Referring to FIGS. 6 and 7, the flux plate 127, which is coupled to the yoke 125 of the head-arm assembly 106, is a plate of magnetically conductive material, such as steel, metal alloys, or the like, that is aligned with the gap between the non-contacting magnetic latch pins 126. In particular, as the head-arm assembly 106 moves into the park position on the disc 104, the flux plate 127 moves into the proximity of the magnetic field, represented by flux lines across the gap 152 between the pins 126. The magnetic field in the gap 152 tends to hold the flux plate 127 and prevent the head-arm assembly 106 from oscillating or moving uncontrollably. As such, damage to the head that would otherwise be caused by such oscillation and uncontrollable movements is minimized.

In preferred embodiments, the gap 152 between the non-contacting magnetic latch pins 126 is wide enough to allow the portion of the yoke 125 with the flux plate 127 to slide into the gap 152. As such, the yoke 125 may enter the gap between the pins 126, without contact, thus avoiding metal to metal contact. As the head-arm assembly 106 is made from aluminum it is substantially nonconductive and thus, does not conduct the magnetic fields generated by the magnets 136, 138, 140, 142.

During the operation of the disc drive assembly, a current is passed through the coil 133 wound around the permanent magnets 136, 138, 140, 142 in the voice coil motor 128. The electric current induces a magnet current in the proximity of the permanent magnets 136, 138, 140, 142. The induced magnetic field interacts with the magnetic fields produced by the permanent magnets such that the movement of the head-arm assembly across the disc is controlled. As such, the read/write head positioning operations is controlled. When the read/write operation is complete, the head-arm assembly may be moved to a parked position.

Figure 8:
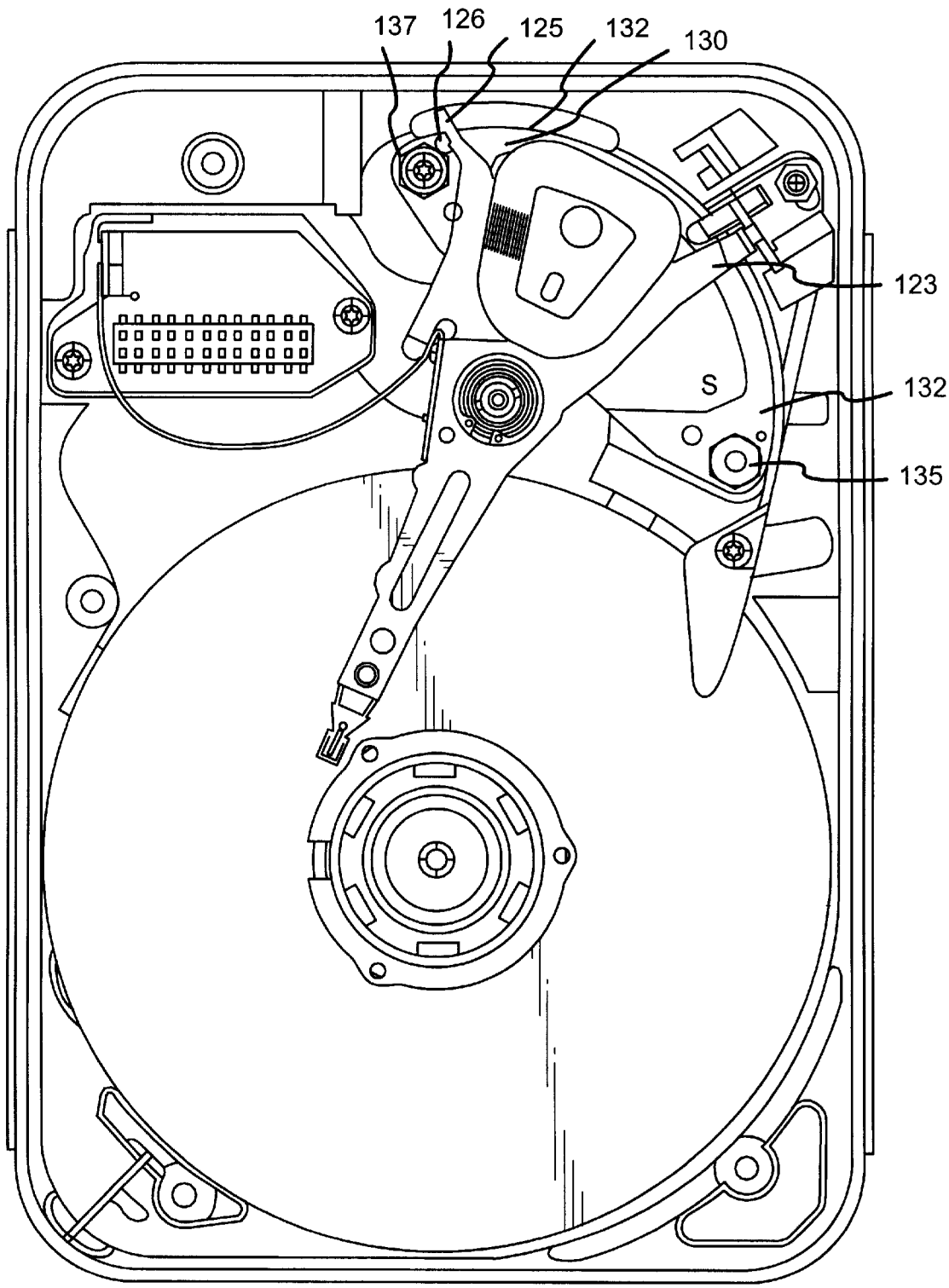
FIG. 8 is a top view of the head in the parked position, wherein a yoke is secured by a magnetic field represented by flux lines across the gap between flux pins.

During the parking of the head-arm assembly 106, the current in the coil 133 is controlled to move the head towards the inner radius of the disc 104 and is then turned off. With reference to FIGS. 7 and 8, as the head moves towards the inner radius, the yoke 125 moves in the direction of the arrow, towards the pins 126. The magnetic field defined in the gap between the pins 126 draws the yoke 125 in place, and therefore, holds the head in place.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive assembly while maintaining substantially the same functionality without department from the scope and spirit of the present invention. In addition, although the preferred embodiment described herein is directed to a non-contacting magnetic latch mechanism, it will be appreciated by those skilled in the art that the teachings of the present invention can be applied to other systems without departing from the scope and spirit of the present invention.

What is claimed is:

1. A motor apparatus for a head-arm assembly in a disc drive system, the motor apparatus comprising:
    a first pair of magnets;
    a second pair of magnets;
    a magnetically conductive support structure for supporting the first and second pairs of magnets, wherein the pairs of magnets are positioned in a spaced relation such that a gap is formed between the magnets in each pair of magnets, the magnetically conductive support structure comprising:
        a first magnetically conductive support member coupled to a first magnet in each of said first and second pairs of magnets;
        a second magnetically conductive support member coupled to a second magnet in each of said first and second pairs of magnets;
        a magnetically conductive stand magnetically coupling the first and second support members together; and
        a magnetically nonconductive stand coupling the first and second support members together;
    a pair of magnetically conductive pins coupled to the support structure, wherein the pins are positioned in a spaced relation such that a gap is created inbetween the pins, the pins providing a conduit for a magnetic field created by the second pair of magnets, wherein the magnetic field is defined through the pins and across the gap represented by a set of flux lines across the gap; and
    a magnetically conductive member fixed with respect to the head-arm assembly and moveable therewith to a position in the proximity of the gap between the pins to thereby latch the head arm assembly.

2. An apparatus as claimed in claim 1, wherein the pins are disposed between at least one magnet and the nonconductive stand.

3. An apparatus as claimed in claim 1, wherein the head-arm assembly further includes a plurality of yokes, wherein one of the yokes includes a flux plate.

4. An apparatus as claimed in claim 1, wherein the flux plate is made from steel.

5. A disc drive system comprising:
    a rotating disc;
    a disc motor operatively coupled to rotate the disc;
    a head-arm assembly including an arm, a suspension member and a read/write head, wherein the head is disposed at one end of the suspension member and the arm is coupled to an opposite end of the suspension member, and wherein the head resides over the disc;
    a motor apparatus for the head-arm assembly, wherein the motor apparatus comprises:
        a first pair of magnets;
        a second pair of magnets;
        a magnetically conductive support structure for supporting the first and second pairs of magnets, wherein the pairs of magnets are positioned in a spaced relation such that a gap is formed between the magnets in each pair of magnets, the magnetically conductive support structure comprising
            a first magnetically conductive support member coupled to a first magnet in each of said first and second pairs of magnets;
            a second magnetically conductive support member coupled to a second magnet in each of said first and second pairs of magnets;
            a magnetically conductive stand magnetically coupling the first and second support members together; and
            a magnetically nonconductive stand coupling the first and second support members together;

a pair of magnetically conductive pins coupled to the support structure, wherein the pins are positioned in a spaced relation such that a gap is created inbetween the pins, the pins providing a conduit for a magnetic field created by the second pair of magnets, wherein the magnetic field is defined through the pins and across the gap represented by a set of flux lines across the gap; and a magnetically conductive member fixed with respect to the head-arm assembly and moveable therewith to a position in the proximity of the gap between the pins to thereby latch the head arm assembly.

6. An apparatus as claimed in claim 5, wherein the pins are disposed between at least one magnet and the nonconductive stand.

7. An apparatus as claimed in claim 5, wherein the head-arm assembly further includes a plurality of yoke, wherein one of the yoke includes a flux plate.

8. An apparatus as claimed in claim 5, wherein the flux plate is made from steel.

9. A parking apparatus for a head-arm assembly in a disk drive system, comprising:

a first magnetically conductive backiron having an inner surface;

a second magnetically conductive backiron having an inner surface positioned substantially parallel to the inner surface of the first backiron such that a gap exists between the inner surfaces of the first and second backirons;

a first magnet having an upper surface defining a magnetic north pole;

a second magnet having an upper surface defining a magnetic south pole;

wherein the first and second magnets are positioned adjacent to one another on the inner surface of the first backiron such that the upper surfaces of the magnets face the inner surface of the second backiron;

a magnetically non-conductive standoff positioned between the first and second backirons;

a first magnetically conductive latch pin positioned on the inner surface of the first backiron adjacent the magnetically non-conductive standoff;

a second magnetically conductive latch pin positioned on the inner surface of the second backiron opposite the first latch pin such that a space exists between the first and second latch pins; and a magnetically conductive flux plate fixed with respect to the head-arm assembly and moveable therewith to a position in the proximity of the space between the latch pins to thereby park the head assembly.

10. A parking apparatus as defined in claim 9, further comprising:

a magnetically conductive standoff positioned between the first and second backirons.

11. A parking apparatus as defined in claim 10, further comprising:

a third magnet having a lower surface defining a magnetic north pole;

a fourth magnet having a lower surface defining a magnetic south pole;

wherein the third and fourth magnets are positioned adjacent to one another on the inner surface of the second backiron such that the lower surface of the third magnet faces the upper surface of the second magnet and the lower surface of the fourth magnet faces the upper surface of the first magnet.

12. A parking apparatus as defined in claim 10, wherein:

the head arm assembly includes at least one yoke, and wherein the flux plate is attached to the at least one yoke.

* * * * *